United States Patent [19]

Wooldridge

[11] Patent Number: 5,172,146
[45] Date of Patent: Dec. 15, 1992

[54] ELECTRONICALLY CONTROLLED OPTICAL COLOR CORRECTION SYSTEM FOR A CAMERA

[76] Inventor: Lloyd A. Wooldridge, 3411 Rosefinch Trail, Austin, Tex. 78746

[21] Appl. No.: 739,169

[22] Filed: Aug. 1, 1991

[51] Int. Cl.$^5$ .......................... G03B 7/24; G03B 11/00
[52] U.S. Cl. ........................................ 354/21; 354/430; 354/482; 354/295
[58] Field of Search ................ 354/430, 482, 21, 295, 354/100, 227.1

[56] References Cited

U.S. PATENT DOCUMENTS

| | | | |
|---|---|---|---|
| 3,246,586 | 4/1966 | Hunt | 354/482 X |
| 3,452,658 | 7/1969 | Krull et al. | 354/430 X |
| 3,468,228 | 9/1969 | Rogers | 354/482 |
| 3,500,730 | 3/1970 | Matsubara et al. | 354/430 |
| 3,672,268 | 6/1972 | Scheikel et al. | 354/430 |
| 4,041,308 | 8/1977 | Fujita | 354/430 X |
| 4,383,735 | 5/1983 | Stravitz | 354/295 X |
| 4,473,289 | 9/1984 | Wallace | 354/295 X |
| 4,511,229 | 4/1985 | Schwartz | 354/430 X |
| 4,682,210 | 7/1987 | Ikemura | 358/29 |
| 4,739,393 | 4/1988 | Seki et al. | 358/29 |
| 4,833,535 | 5/1989 | Suzuki et al. | 358/135 |
| 4,847,680 | 7/1989 | Okino | 354/430 X |
| 4,887,121 | 12/1989 | Pritchard | 354/430 |
| 4,918,470 | 4/1990 | Whiteside | 354/21 |

*Primary Examiner*—W. B. Perkey
*Attorney, Agent, or Firm*—Joseph F. Long

[57] ABSTRACT

The present invention covers automatic and manual control of the color of light striking film in a camera by electrically manipulating the color purity of one or more optical color correction filter elements made of clear and dyed dichroic liquid crystals that do not significantly disperse light being transmitted through the filters. In a preferred embodiment for a camera the opto-electrical and electrical components of the invention are designed to provide automatic correction of incident light on a photographic subject to match the color temperature standard to which the film was manufactured.

14 Claims, 2 Drawing Sheets

ELECTRONICALLY CONTROLLED OPTICAL COLOR CORRECTION SYSTEM FOR A CAMERA

BACKGROUND OF THE INVENTION

Modern camera designs often include automatic functions needed to produce technically correct photographs, transport film forward or in reverse as needed, determine film speeds, adjust electronic flash power and duration, and other functions. However, photographers using color film find that the color temperature of light illuminating their subjects, also called incident light, rarely corresponds to the color temperature standard to which the film was manufactured. Daylight type color film requires a blue filter to compensate for excessively yellow incident light, whereas a yellow filter is needed to compensate for excessively blue incident light. To achieve a balance between the color temperatures of the incident light and the film's color temperature standard, a photographer must either guess or measure the color temperature of the incident light and install over the front of the lens one of a few available choices of color correcting filters.

In the science of color measurement and manipulation measurement of the intensity, purity, or saturation, all of which are synonymous terms, of the red and blue components of incident light effectively allows correct reproduction color on film. Red, blue, and yellow are spoken of as primary colors but manipulation or changing purity of yellow and blue colors is sufficient for our purpose even though the colors of the rainbow which result from separation of sunlight are usually spoken of as violet, indigo, blue, green, yellow, orange and red.

Recently dyed and undyed dichroic liquid crystal filters, available from Crystalloid Electronics Co. in Hudson, Ohio, Hamlin, Inc. in Lake Mills, Wis. and others, may be used to effectively change the color temperature of light going through a filter. The output from these filters may be varied by impressing an alternating current to vary their purity, hence, the transparency and the amount of yellow or blue light emitted by the filter. A combination of a variable yellow filter and a variable blue filter allows correction of incident light to match the color temperature standard to which the film is manufactured.

The color temperature standard to which daylight film is manufactured is approximately 5,400 degrees K which is the yearly average of the color temperature of sunlight measured daily at noon in Washington, D.C. Color films for making photographs of subjects illuminated with incandescent lamps are designed to produce proper colors when the incandescent lighting is approximately 3,200 degrees K. Films designed to balance colors under other color temperature conditions are also available.

This invention includes components as follows that may be either installed into the body of a camera or into a front-of-the-lens device which is designed for independent operation and attachment to the camera:

1) A manual switch to set the device to either off, or automatic or manual mode of operation.
2) Two photosensors, one each for detecting and producing electrical outputs corresponding to the red and blue components of incident light illuminating the photographic subject.
3) An electronic central processing unit to receive information and data inputs from the various peripheral switches and sensors; calculate the currents needed for proper operation of the variable color filters; control the supply of electrical currents to the variable color filters; and, output data to other optionally installed devices.
4) A device built into the camera for the purpose of reading a color standard code imprinted or otherwise installed on the film by the film manufacturer and transmitting this information to the central processing unit for use in computing the proper color filter adjustments.

Alternatively, a manual switch for selecting the color rating of the color film inside the camera, i.e., daylight type film, indoor type film, or other color standard may be used. A central processor, CPU, takes into account such settings when computing the proper filter adjustments to balance the color temperature of incident light with the film type.

5) DC power supply which may be a battery installed in the camera or in the front-of-the-lens device.
6) A variable color correction filter unit which is designed for installation inside the camera body at a position between the camera lens and film, or for attachment to the front of the camera lens.

This variable color correction filter unit has two separate layers: a first layer of reverse mode dichroic liquid crystals that is normally essentially transparent but that becomes increasingly more yellow as an alternating current is impressed across the layer and a second layer of reverse mode liquid crystals that becomes increasingly more blue as an alternating current is impressed across the layer. Regular mode liquid crystal filters achieves the same results, but the color purity with no electrical current applied is dark and becomes transparent in relationship to the amount of alternating current applied.

7) An optional manual control to vary the color purity of each element of the filter. This feature will permit the photographer to increase or decrease either the yellow or blue color of photographs.
8) An optional switch to lock the photo sensitive device measurement of incident light into the computational circuitry of the central processor unit. This will permit photographers to take close-up measurements of the predominant color of incident light illuminating the photographic subject, move some distance away from the subject without the device automatically correcting for other colors of incident light that may be prevalent, and correct or enhance the photograph according to the desires of the photographer.
9) An optional electronic display such as light emitting diodes or a liquid crystal display to indicate color temperature of incident light illuminating the subject as well as corrected color temperatures of light after passing through the variable color filter may also be included.

Although this invention is described in terms and details to completely automate a camera, many other uses are visualized including, but not limited to, color variation and enhancement by polarization or other means for use with microscopes, color measurement, and automating control systems dependent upon color. We, therefore, wish to be limited only to spirit and purpose as outlined in these claims and specifications rather than specific details.

SUMMARY OF THE INVENTION

The major objective of the present invention is to provide an automatic color correction system for use in cameras using color film. The system comprises a device to measure red and blue components of incident light on the photographic subject; a manual or automatic way to determine the type of film being used and a central processing unit to receive this input data and output signals to a filter device that consists of two electrically controlled variable filter elements of different dominant wave lengths. One filter has a dominant wave length in the blue color spectrum, whereas the other has a dominant wave length in the yellow spectrum. Each filter is independently and automatically controlled by the central processing unit. The amount of color correction is thereby automatically controlled to eliminate excessive yellow or blue light, if any, so that the color temperature of the image recorded on the film will correspond to that for which the film was manufactured.

Further objectives of the present invention are to provide optional means, as described below, to be installed in or on cameras for controlling and manipulating the color temperature of light exposing the film:

a) An electric color balance switch to set the mode to either "Automatic," "Manual," or "Off" to allow the user to choose use of automatic operation for normal color balance or manual color change for special effects.

b) A Color Balance Lock, which is an electrical switch, manually operated to lock into the CPU the color temperature measurement of light illuminating a portion of photographic subject, such measurement to be used for subsequent use when taking a photograph.

c) A Filter Color Purity Control, which comprises an electrical switch, manually operated, to adjust the color purity of either the blue or yellow filter element, thus permitting the photographer to employ, at will, a blue or yellow cast to photographs for artistic or other desired effect.

d) A means to enter the color film type into the CPU which may be an automatic detector or manually operated switch to set the color temperature rating of the film being used in the camera.

e) A sensor device installed to detect and output electrical current to a central processing unit based on measurement of the red and blue components of incident light.

f) A liquid crystal device to display the color temperature of the visible light illuminating a photographic subject and optionally, the color temperature of light after passing through the color filter device.

All the elements as described are in a retrofit housing in one embodiment or inside a camera in a preferred embodiment.

DETAILED DESCRIPTION OF THE DRAWINGS

The invention may best be described by reference to the drawings.

Figure 1:
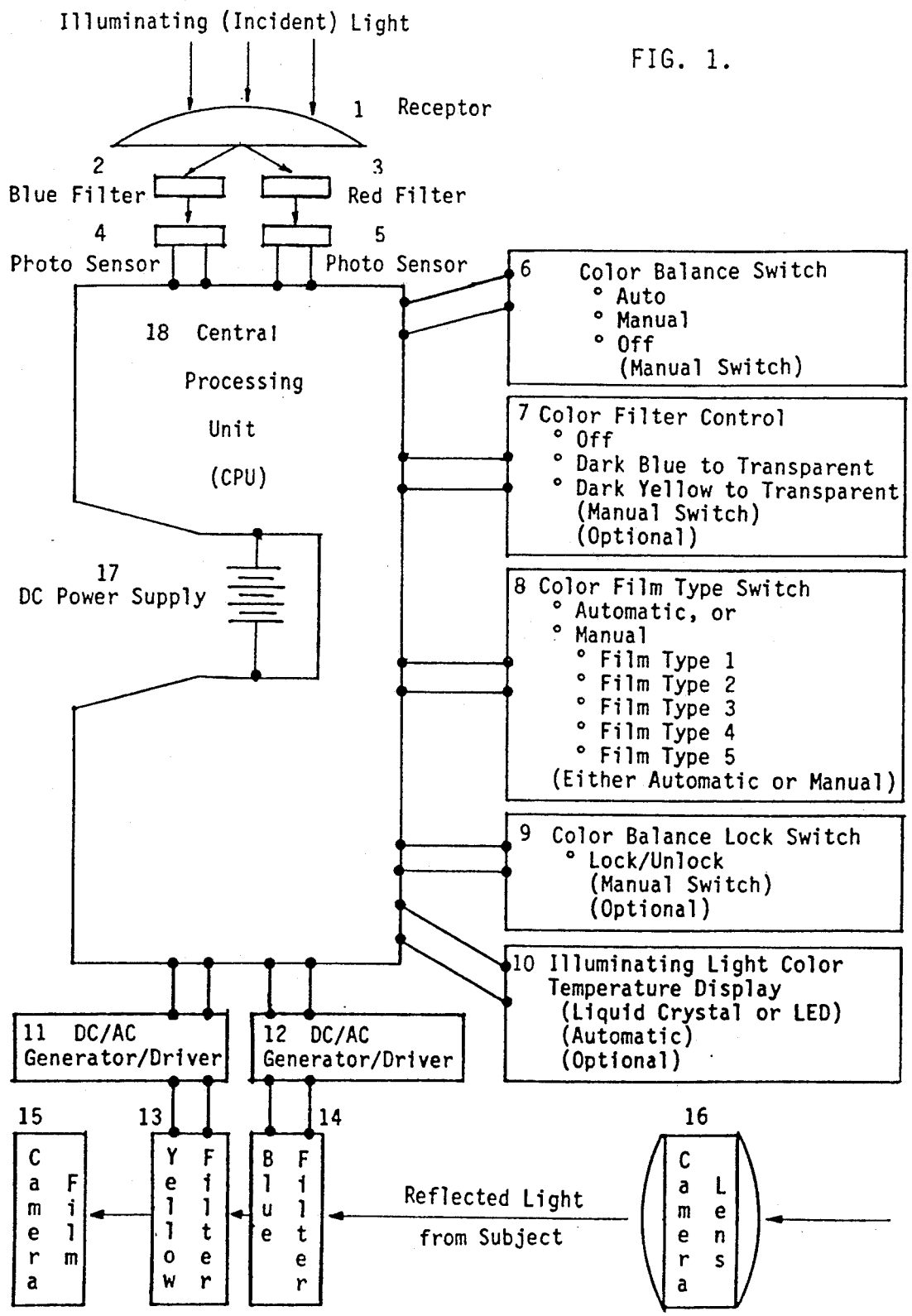
FIG. 1 shows the invention in schematic form, indicating the electrical connections.
Figure 2:
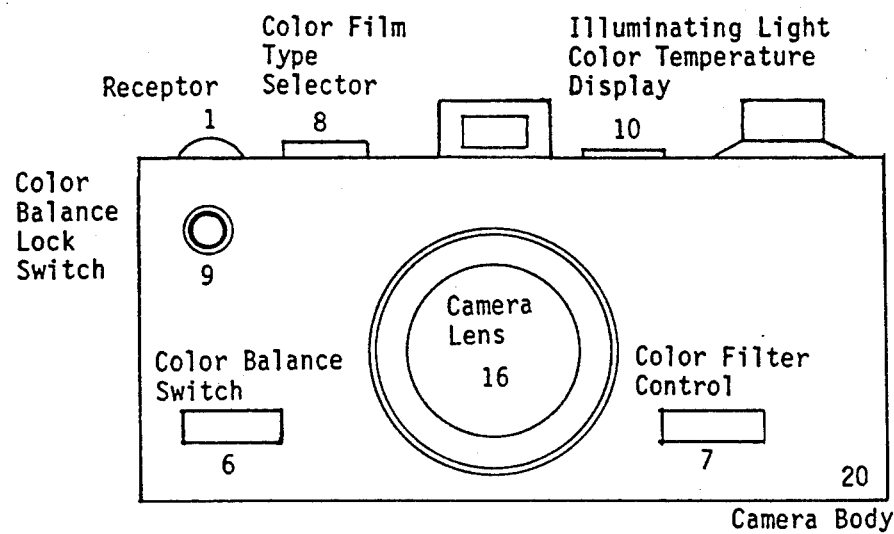
FIG. 2 shows a preferred embodiment in a camera body.
Figure 3:
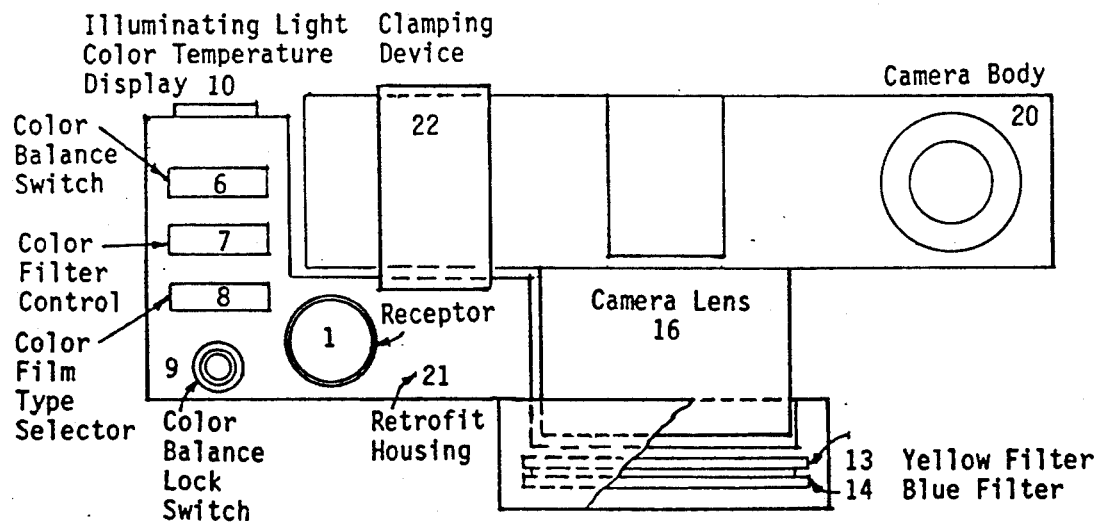
FIG. 3 shows an embodiment of the invention for retrofitting a camera.

In FIG. 1 we show schematically all the elements of the preferred embodiment of the system. These elements may be built into a camera as indicated in FIG. 2 or built into a camera retrofit unit as shown in FIG. 3. Referring now to FIG. 1, electric power supply is provided by DC batteries 17 which are normally installed in the camera body. In other embodiments the battery may be mounted in a housing designed to hold all the system and to have the variable color correction filters 13 and 14 over the camera lens 16.

Receptor 1 protrudes from the housing of the camera or retrofit unit preferably pointing upward to measure incident light striking the subject rather than reflected light from the subject. It is configured in any shape that efficiently collects incident white light, commonly planoconvex. It can be of plastic or glass material that does not substantially alter the color temperature of incident light passing through the receptor and which provides a reasonably high degree of light transmittance through the receptor.

Blue and red absorption filters 2 and 3 absorb red and blue light, respectively, from light passing through the receptor 1. Light from each filter projects onto its corresponding photo sensor 4 or 5. Optionally, in other embodiments, in lieu of absorption filters, a dispersion prism can be used to separate white light received from the receptor 1 into red and blue wavelengths and direct the two wavelengths onto their respective photo sensors 4 and 5.

The two photo sensors 4 and 5 are sensitive to visible light. One is sensitive to the blue spectrum and the other is sensitive to the red spectrum. Each produces an electric current that varies with the degree of the sensor excitation from the light striking the sensors. Electrical output from the photo sensors 4 and 5 feed into the central processing unit 18. The central processing unit will calculate incident light color temperature from these measurements and display this temperature on Display 10.

Using this electrical input and film type input from manual setting of switch 8 or from an automatic film sensor in the camera, the central processing unit 18 calculates and outputs signals for proper operation of the yellow and blue variable color correction filters 13 and 14 which are energized by DC/AC converters and square wave generators 11 and 12.

We have described the simplest embodiment and in a preferred embodiment other options for operator control are included. CPU terminals accommodate the connections of required switches for allowing choice for Color Balance Mode 6, Color Film Type 8, Color Filter Control 7, and Color Balance Lock 9, and Incident Light Color Temperature Liquid Crystal Display 10.

Color Balance Mode switch 6 is manually set to either "automatic" or "manual" operating mode, or to the "Off" position. Each setting causes the following operation:

a) In the "automatic" position the central processing unit 18 automatically processes data received from the photo sensors 4 and 5 and Color Film Type switch 8 and supplies the proper amount of power to the DC/AC Drivers 11 and 12. In this mode the central processing unit 18 disconnects the Color Filter Control 7 from the circuitry.
   b) In the "manual" position the central processing unit 18 disconnects the inputs of the photo sensors 4 and 5 and relies on the settings of the Color Filter Control 7 and the Color Film Type 8 to determine the amount of power to be supplied to the DC/AC Drivers 11 and 12.
   c) In the "off" position, the entire system is inoperative and the camera will operate without any color temperature corrections or adjustments.

Color Filter Control switch 7 is manually operated and is operative only when the Color Balance Mode switch 6 is set to the "manual" position. The control is manually moved to a neutral position or to either a blue or yellow filter setting, the purity of which can be controlled.
   a) When in the "Off" position, the central processing unit 18 will cause both the variable color correction filters 13 and 14 to adjust to a state of being without color or tint.
   b) When positioned in the "blue" range, the central processing unit 18 will cause the yellow variable color correction filter 13 to adjust to a state of being without color or tint. Movement of the control in the blue range varies the purity of the blue variable color correction filter 14 from light to dark blue, as desired by the camera operator.
   c) When positioned in the "yellow" range, the central processing unit 18 will cause the blue variable color correction filter 14 to adjust to a state of being without color or tint. Movement of the control in the yellow range varies the purity of the yellow variable color correction filter 13 from light to dark yellow, as desired by the camera operator.

Color Temperature Lock 9 is a manually operated switch which functions when the Color Balance Mode switch 6 is set to automatically operate the variable color correction filters 13 and 14. With Color Balance Mode switch 6 in the automatic position, the camera operator can take a direct reading of the color temperature of the light illuminating any specific part of the photographic subject. To take a direct reading, the camera operator can hold the receptor 1 at the part of the subject to be measured and point it toward the light that illuminates such part of the subject. The camera operator then operates the Color Temperature Lock switch 9 to lock into the memory of central processing unit 18 the color temperature of the part measured. Locking of the switch position of the Color Temperature Lock 9 causes the following to occur:
   a) The central processing unit 18 computes the color temperature of the light that was measured by the camera operator and adjusts the purities of variable color correction filters 13 and 14. Therefore, a constant amount of color temperature correction of illuminating light will be made, regardless of the illuminating light's actual color temperature.
   b) The automatic operation of the device is terminated until the Color Temperature Lock switch 9 is manually unlocked by the camera operator.

Illuminating Light Color Temperature display 10 is activated by the central processing unit 18 and displays the color temperature of illuminating light passing through the receptor. The purpose of the display is to inform the camera operator of the color temperature conditions under which he is operating. The operator may then choose to put color balance mode switch 6 in the manual position and use Color Filter Control switch 7 to produce pictures with enhanced yellow or blue color.

In FIG. 2 we show a preferred embodiment built into a camera 20. The elements of the system are as shown schematically in FIG. 1. A receptor 1 should be located to receive the same temperature of incident light that illuminates the photographic subject. Filters 2 and 3 and photo sensors 4 and 5 are located behind sensor 1 and communicate with the central processing unit 18. Variable color correction filters 13 and 14 would be inside body 20 behind the lens 11. Color Balance Mode switch 6 is manually set to allow the system to automatically balance light temperature or color of incident light to properly match the color temperature of the film being used. This color temperature may be manually set with switch 8 or may be automatically fed to the central processing unit from markings on the beginning end of the film. Color temperature lock switch 9 may be used to lock the color temperature of one area of the subject being photographed into the memory of the central processing unit. Color filter control switch 7 would be set in the off position for normal automatic control but may be used by the operator to enhance either the yellow or blue color of the incident light. A liquid crystal display 10 of incident light temperature may aid the operator in this decision to use manual switch 7.

In FIG. 3 we show a retrofit housing 21 held to camera body 20 by a clamping device 22 such as a Velcro strip that holds the body of the housing with variable color correction filters 13 and 14 located in front of the camera lens 16. All elements of the electronically controlled optical color correction system including the battery 17, FIG. 1, are included in this retrofit housing with operation being as described.

What is claimed is:

1. An electronically controlled optical color correction unit for a camera comprising:
   1) a camera body;
   2) a central processor unit in said camera body;
   3) a diffuser means in said camera body to diffuse incident light through a red filter and through a blue filter;
   4) blue light photosensitive diodes that receive light through said blue filter and converts said light to a first electronic signal that feeds to said central processor unit;
   5) red light photosensitive diodes under said red filter that converts said light to a second electronic signal that feeds to said central processor unit;
   6) a film temperature determination means to feed a third electronic signal to said central processor unit; said central processor unit then using said first electronic signal, said second electronic signal and said third electronic signal to calculate proper output voltages to apply across an essentially transparent, electronically controlled variable color filter means that changes purity of yellow and blue colors to adjust exit light to match said film color temperatures;
   7) a battery in said camera to power said central processing unit.

2. An electronically controlled optical color correction unit for a camera as in claim 1 wherein film color temperature determination means is a manual switch with settings that may be set to indicate the color temperature rating of any of several types of films.

3. An electronically controlled optical color correction unit for a camera as in claim 1 wherein said film temperature determination means is an internal unit to read markings on a film into said central processor unit.

4. An electronically controlled optical color correction unit for a camera as in claim 1 wherein said essentially transparent electronically controlled variable color filter means comprises a transparent substrate with yellow light controlling dichroic liquid crystal on a first side of said substrate and blue light controlling dichroic liquid crystals on a second side of said substrate to allow separate voltages from said central processor unit to control purity of each color.

5. An electronically controlled optical color correction unit for a camera as in claim 1 further comprising a liquid crystal display to indicate color temperature of incident light.

6. An electronically controlled optical color correction unit for a camera as in claim 1 comprising a color filter control switch and a color balance mode switch that may be set in a first position to allow automatic color balancing of light and may be set in a second position to disable automatic color balancing and may be set in a third position to allow use of said color filter control switch so that the operator may manually enhance colors of photographic subjects striking a film in said camera by manipulation of said variable color correction filters.

7. An electronically controlled optical color correction unit as in claim 1 further comprising a color temperature lock switch that enables an operator to measure temperature of incident light close to one part of a subject being photographed and lock that measurement into said central processor unit.

8. An electronically controlled optical color correction unit comprising:
  1) a camera body;
  2) a housing and a fastener to fasten said housing to said camera body;
  3) a central processor unit in said housing;
  4) blue light photosensitive diodes that receive light through said blue filter and converts said light to a first electronic signal that feeds to said central processor unit;
  5) red light photosensitive diodes under said red filter that converts said light to a second electronic signal that feeds to said central processor unit;
  6) a film color temperature determination means to feed a third electronic signal to said central processor unit; said central processor unit then using said first electronic signal, said second electronic signal and said third electronic signal to calculate proper output voltages to apply across an essentially transparent, electronically controlled variable color filter means that changes purity of yellow and blue colors to adjust exit light to match said film color temperatures;
  7) a battery in said housing to power said central processor unit.

9. An electronically controlled optical color correction unit for a camera as in claim 8 wherein film color temperature determination means is a manual switch with settings that may be set to indicate the color temperature rating of any of several types of films.

10. An electronically controlled optical color correction unit for a camera as in claim 8 wherein said film color temperature determination means is an internal unit to read markings on a film into said central processor unit.

11. An electronically controlled optical color correction unit for a camera as in claim 8 wherein said essentially transparent electronically controlled variable color filter means comprises a transparent substrate with yellow light controlling dichroic liquid crystal on a first side of said substrate and blue light controlling dichroic liquid crystals on a second side of said substrate to allow separate voltages from said central processor unit to control purity of each color.

12. An electronically controlled optical color correction unit for a camera as in claim 8 further comprising a liquid crystal display to indicate color temperature of incident light on photographic subject.

13. An electronically controlled optical color correction unit for a camera as in claim 8 further comprising a color filter control switch and a color balance mode switch that may be set in a first position to allow automatic color balancing of light and may be set in a second position to disable automatic color balancing and may be set in a third position to allow use of said color filter controls switch so that the operator may manually enhance colors of photographic subjects striking a film in said camera by manipulation of said variable color correction filters.

14. An electronically controlled optical color correction unit as in claim 8 further comprising a color temperature lock switch that enables an operator to measure color temperature of incident light close to one part of a subject being photographed and lock that measurement into said central processor unit.

* * * * *